United States Patent
Morishima et al.

(10) Patent No.: US 11,318,710 B2
(45) Date of Patent: May 3, 2022

(54) JOINED MEMBER ASSEMBLY METHOD AND JOINED MEMBER

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masahiko Matsuhashi, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 527 days.

(21) Appl. No.: 16/305,055

(22) PCT Filed: Jun. 30, 2017

(86) PCT No.: PCT/JP2017/024267
§ 371 (c)(1),
(2) Date: Nov. 28, 2018

(87) PCT Pub. No.: WO2018/012328
PCT Pub. Date: Jan. 18, 2018

(65) Prior Publication Data
US 2020/0282696 A1    Sep. 10, 2020

(30) Foreign Application Priority Data

Jul. 14, 2016    (JP) .............................. JP2016-139314

(51) Int. Cl.
*B29C 70/44* (2006.01)
*B32B 5/26* (2006.01)
(Continued)

(52) U.S. Cl.
CPC ................ *B32B 5/26* (2013.01); *B29C 65/68* (2013.01); *B29C 70/24* (2013.01); *B29C 70/443* (2013.01);
(Continued)

(58) Field of Classification Search
CPC ..... B29C 70/24; B29C 70/443; B29C 70/682; B29C 70/687
See application file for complete search history.

(56) References Cited

U.S. PATENT DOCUMENTS 2,909,784 A * 10/1959 Forsberg ................... B64C 3/00
                                                                112/440
3,602,964 A *  9/1971 Currier .................. D03D 25/00
                                                                28/158
(Continued)

FOREIGN PATENT DOCUMENTS

JP    S46-4543 A  *  2/1971
JP    46004543 A    11/1971
(Continued)

OTHER PUBLICATIONS

International Search Report for International Application No. PCT/JP2017/024267 dated Sep. 5, 2017; 13pp.
(Continued)

*Primary Examiner* — Matthew J Daniels
(74) *Attorney, Agent, or Firm* — Kanesaka Berner and Partners LLP

(57) ABSTRACT

A joined member assembly method includes: a step in which a substrate is inserted in a gap between a superposed first component and a second component, said substrate being configured from a multilayer fabric that is capable of expanding as a result of heating and that is flexible after expansion and a reinforcing material woven into the multilayer fabric; a step in which the substrate is heated and made
(Continued)

to expand in the thickness direction; a step in which the gap is filled with a resin and the substrate is impregnated with the resin; and a step in which the resin is cured. A step in which a seam is created by machining in accordance with a measured gap shape is omitted.

2 Claims, 5 Drawing Sheets

(51) Int. Cl.
  *B32B 5/02* (2006.01)
  *B29C 65/68* (2006.01)
  *B29C 70/24* (2006.01)
  *B29C 70/10* (2006.01)
(52) U.S. Cl.
  CPC .............. *B32B 5/024* (2013.01); *B29C 70/10* (2013.01); *B32B 2260/046* (2013.01); *B32B 2262/0276* (2013.01); *B32B 2262/101* (2013.01); *B32B 2262/106* (2013.01); *B32B 2262/14* (2013.01); *B32B 2307/736* (2013.01)

(56) References Cited

U.S. PATENT DOCUMENTS

| | | | | |
|---|---|---|---|---|
| 3,769,142 | A * | 10/1973 | Holmes | B29C 70/543 428/113 |
| 3,811,480 | A * | 5/1974 | Villiger | D03D 25/00 139/384 R |
| 3,834,424 | A * | 9/1974 | Fukuta | D03D 41/004 139/22 |
| 4,038,440 | A * | 7/1977 | King | D03D 41/004 442/205 |
| 4,132,577 | A * | 1/1979 | Wintermantel | B28B 7/28 156/156 |
| 4,571,355 | A * | 2/1986 | Elrod | B32B 5/08 428/102 |
| 4,741,087 | A | 5/1988 | Plummer, Jr. | |
| 4,777,859 | A | 10/1988 | Plummer, Jr. | |
| 4,853,269 | A * | 8/1989 | Fukumori | E02B 3/127 428/43 |
| 5,211,967 | A * | 5/1993 | Yasui | B29C 70/24 139/11 |
| 5,688,594 | A | 11/1997 | Lichscheidt et al. | |
| 6,558,503 | B1 | 5/2003 | Healey | |
| 7,258,828 | B2 * | 8/2007 | Fish | B29C 66/721 264/257 |
| 9,381,702 | B2 * | 7/2016 | Hollander | B33Y 10/00 |
| 9,815,245 | B2 * | 11/2017 | Grove-Nielsen | C08G 69/00 |
| 2003/0077965 | A1 * | 4/2003 | Mack | B29C 70/443 442/180 |
| 2004/0128946 | A1 * | 7/2004 | Salmon | B29C 70/24 52/782.1 |
| 2015/0111457 | A1 * | 4/2015 | Khokar | D04H 3/05 442/366 |
| 2016/0215558 | A1 * | 7/2016 | Byun | E06B 9/262 |

FOREIGN PATENT DOCUMENTS

| | | |
|---|---|---|
| JP | S47025274 A | 10/1972 |
| JP | S6065194 A | 4/1985 |
| JP | H02200872 A | 8/1990 |
| JP | H06094057 A | 4/1994 |
| JP | H06128837 A | 5/1994 |
| JP | 2001270041 A | 10/2001 |
| JP | 2003276023 A | 9/2003 |
| JP | 2005279990 A | 10/2005 |
| JP | 2007100256 A | 4/2007 |
| JP | 4763196 B2 | 8/2011 |
| JP | 2016065164 A | 4/2016 |

OTHER PUBLICATIONS

Extended European Search Report for European Application No. 17827458.5 dated May 22, 2019; 8pp.

* cited by examiner

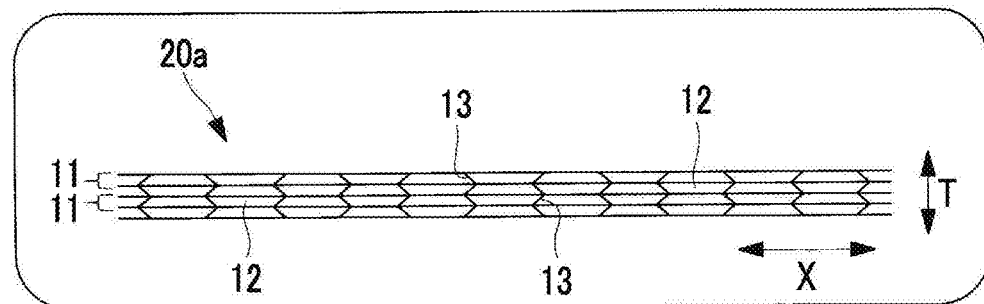
FIG. 3A
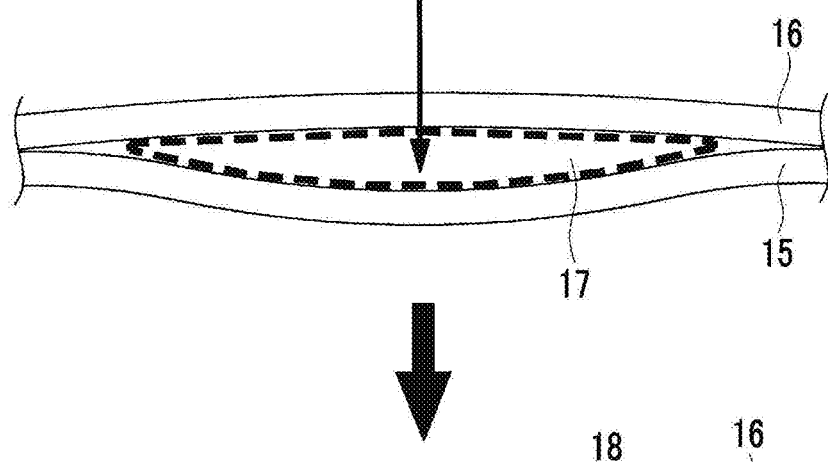
FIG. 3B
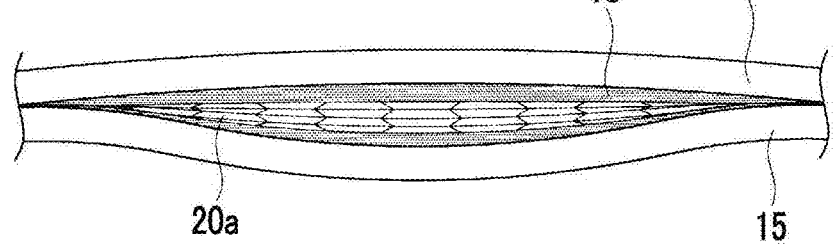
FIG. 3C
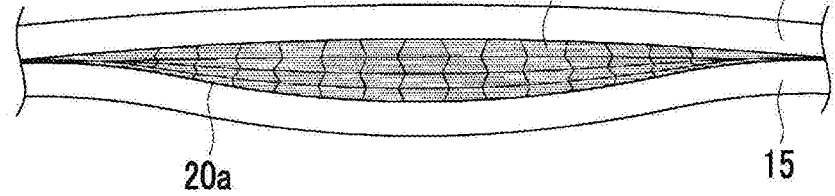

JOINED MEMBER ASSEMBLY METHOD AND JOINED MEMBER

RELATED APPLICATIONS

The present application is a National Phase of International Application Number PCT/JP2017/024267 filed Jun. 30, 2017 and claims priority from Japanese Application Number 2016-139314 dated Jul. 14, 2016.

TECHNICAL FIELD

The present invention relates to a joined member assembly method and a joined member.

BACKGROUND ART

As means for joining two components, there is an adhesive or a fastening member. In PTL 1, two components are joined together by introducing an adhesive between the components.

However, it is difficult to guarantee the joining strength between the components joined only by the adhesive. Therefore, a fastening member is used for joining components requiring a guarantee of joining strength or components to which an adhesive cannot be applied.

CITATION LIST

Patent Literature

[PTL 1] Japanese Patent No. 4763196 (claim 1)

SUMMARY OF INVENTION

Technical Problem

Each of members to be joined has shape tolerance due to the influence of shape accuracy up to previous steps. When components with large shape tolerance are overlapped, a gap is generated between mating surfaces (joining surfaces) of the components. When a gap is present between the components, there is concern of fracture due to excessive tensile load applied to a fastening member during fastening, or excessive deformation locally generated in members to be fastened.

Therefore, when components are assembled together using a fastening member, there is a need to fill a gap between members before a fastening operation.

For example, the gap between the members is filled by the following steps (see FIGS. 5A to 5C).

(A) First, two components (a first component 1 and a second component 2) are overlapped and a shape of the gap between the components is measured.

(B) Next, a solid material 3 is machined according to the shape of the gap to form a seam 4.

(C) The seam 4 is inserted into the gap 5 to fill the gap between the joining surfaces.

The shape of the gap is measured by techniques such as optical surface measurement, gap measurement using a probe or the like, and pouring and solidification of a resin. As the solid material 3, an aluminum alloy, a resin, or the like is used.

The above-described method is extremely laborious and is thus a labor-intensive method.

The present invention has been made in view of the above-described circumstances, and an object thereof is to provide a joined member assembly method that makes it possible to increase the efficiency of an assembly step by omitting a step in which a seam is created by machining in accordance with a measured gap shape, and a joined member assembled by the same.

Solution to Problem

In order to solve the above-described problem, the joined member assembly method and the joined member of the present invention employ the following means.

The present invention provides a joined member assembly method including: a step of inserting a base material which is constituted by a multilayer structure fabric that is expandable by heating and is flexible after expansion and a reinforcing material woven into the multilayer structure fabric, into a gap between a plurality of overlapped members; a step of heating the base material so as to cause the base material to expand in a thickness direction; a step of filling the gap with a resin so as to cause the base material to be impregnated with the resin; and a step of curing the resin.

According to the aspect, the multilayer structure fabric can be caused to expand by heating and follow a complex three-dimensional shape in the gap by the expanding, so that the multilayer structure fabric can be disposed in all the corners of the gap.

By weaving the reinforcing material, the rigidity of the multilayer structure fabric can be improved. The cured resin and the multilayer structure fabric (base material) into which the reinforcing material is woven function as a seam in the gap. The rigidity for supporting the stress applied to the gap is imparted to the seam by the cured resin and the reinforcing material woven into the multilayer structure fabric. By disposing the base material in the gap, the rigidity is higher than in a seam only made of a resin.

The combination of the base material that expands to fill the gap and the resin impregnated and cured in the base material has strength and rigidity required for the seam filling the gap between the joined portions and is interposed while the member shapes of the joined portions are maintained. As a result, this leads to prevention of deformation and burden of the fastening member, so that excessive tensile load applied to the fastening member and excessive deformation locally generated in the members to be fastened can be prevented.

In the aspect of the present invention, the multilayer structure fabric has a fabric layer in which at least two kinds of yarns which are different in thermal shrinkage so as to expand in the thickness direction by being heated are arranged.

When the fabric layer in which at least two kinds of yarns different in thermal shrinkage are arranged is heated at a predetermined temperature, the yarn having high thermal shrinkage shrinks and correspondingly the yarn having low thermal shrinkage is bent. By utilizing such properties, it is possible to form a multilayer structure fabric which expands in a thickness direction.

In the aspect of the present invention, after the base material is inserted into the gap, the gap may be impregnated with the resin, the base material may be heated so as to expand in the thickness direction, and the resin may be thereafter cured.

By heating the base material after being inserted into the gap, the base material follows the shape of the gap while expanding. The base material holds its shape between a plurality of overlapped members and improves the strength and rigidity required for the joined portions. Accordingly, excessive tensile load applied to the fastening member and local deformation generated in the members to be fastened can be prevented.

In the aspect of the present invention, the base material may be heated so as to expand in the thickness direction, the expanded base material may be inserted into the gap, the base material may be thereafter impregnated with the resin, and the base material may be thereafter cured.

Since the multilayer structure fabric has flexibility even after expansion, in addition to being able to cope with cases where heating and expansion are difficult after insertion into the gap, a base material having an appropriate size for the amount of a generated gap can be selected.

The present invention provides a joined member including: a plurality of members arranged in an overlapped state; a seam which is present to fill a gap between the plurality of members, in which the seam includes a base material and a resin, the base material includes a multilayer structure fabric and a reinforcing material woven into the multilayer structure fabric, and the multilayer structure fabric has a fabric layer in which at least two kinds of yarns which are different in thermal shrinkage are arranged, and the fabric layer has a shape in which the yarn having low thermal shrinkage is bent due to a shrinkage stress of the yarn having high thermal shrinkage and expands in the thickness direction.

Advantageous Effects of Invention

According to the present invention, by using the base material having the reinforcing material woven into the self-moldable multilayer structure fabric, a step in which a seam is created by machining in accordance with a measured gap shape is omitted, thereby increasing the efficiency of an assembly step.

BRIEF DESCRIPTION OF DRAWINGS

FIGS. 3A to 3C are flowcharts of a joined member assembly method according to a first embodiment.

DESCRIPTION OF EMBODIMENTS

First Embodiment

First, a joined member assembled by an assembly method according to this embodiment will be described. The joined member includes a plurality of overlapped members, and a seam which is present to fill a gap between the plurality of members. The joined member further includes a fastening member which fastens the plurality of overlapped members.

The number of overlapped members may be two or more. Hereinafter, description will be provided on the assumption that the overlapped members include a first component and a second component. The first component and the second component are made of a fiber reinforced composite material, an aluminum alloy, or the like. The fiber reinforced composite material is composed of a matrix and reinforcing fibers. The matrix is a thermosetting resin such as an epoxy resin, a thermoplastic resin such as polyether ether ketone (PEEK), polyether ketone ketone (PEKK), polyphenylene sulfide (PPS), or the like. The reinforcing fiber is carbon fiber, glass fiber, aramid fiber, or the like. The aluminum alloy is in 2000 series, 7000 series, or the like.

The seam includes a base material and a resin 18'. The base material is constituted by a multilayer structure fabric and a reinforcing material.

Figure 1A:
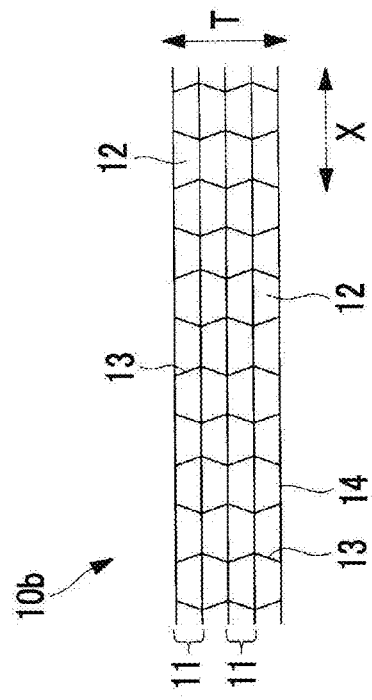
FIGS. 1A and 1B are schematic longitudinal sectional views illustrating an example of a multilayer structure fabric.
Figure 1B:
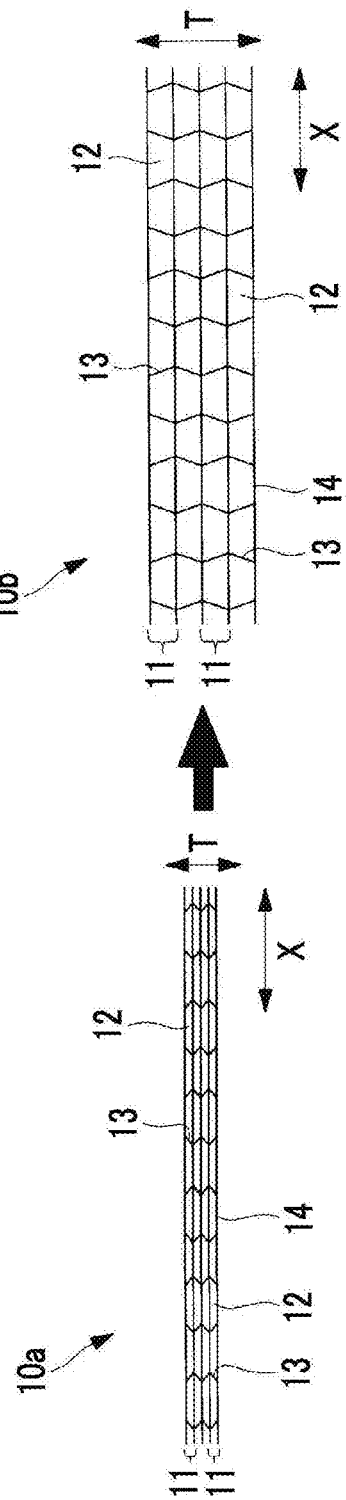

FIGS. 1A and 1B are schematic longitudinal sectional views illustrating an example of the multilayer structure fabric. In the figure, FIG. 1A shows a multilayer structure fabric 10a before expansion, and FIG. 1B shows a multilayer structure fabric 10b after expansion.

The multilayer structure fabric has a plurality of fabric layers 11 laminated and has a mesh-like longitudinal sectional structure. Since meshes 12 have an elastic structure, the shapes of the multilayer structure fabrics 10a and 10b can be deformed by an external pressure. That is, the multilayer structure fabrics 10a and 10b have shape flexibility.

The fabric layer 11 is a fabric composed of at least two kinds of yarns different in thermal shrinkage. The warps and wefts of the fabric layer 11 are made of polyester, nylon, or the like.

In FIGS. 1A and 1B, a high shrinkage yarn 13 is woven in a warp direction X of the fabric layer 11. The high shrinkage yarn 13 is a fiber yarn for self-molding of the multilayer structure fabric. The high shrinkage yarn 13 has relatively high thermal shrinkage compared to at least a warp 14. The material of the high shrinkage yarn 13 is polyester, nylon, polyethylene, acryl, polyurethane, or the like. The high shrinkage yarn 13 is disposed such that the fabric layer 11 expands in a thickness direction T (laminating direction) when the fabric layer 11 is heated at a predetermined temperature.

The reinforcing material (not illustrated) is woven in at least one direction of a weft direction (the direction perpendicular to the figure) and the warp direction X of the multilayer structure fabrics 10a and 10b. In a case of being woven in a plurality of directions, it is preferable that the orientation ratios in the respective directions of the reinforcing material are the same degree. The reinforcing material may be woven in a plurality of directions in a single fabric layer 11, or may be oriented in one direction in each of the plurality of fabric layers 11.

Figure 2B:
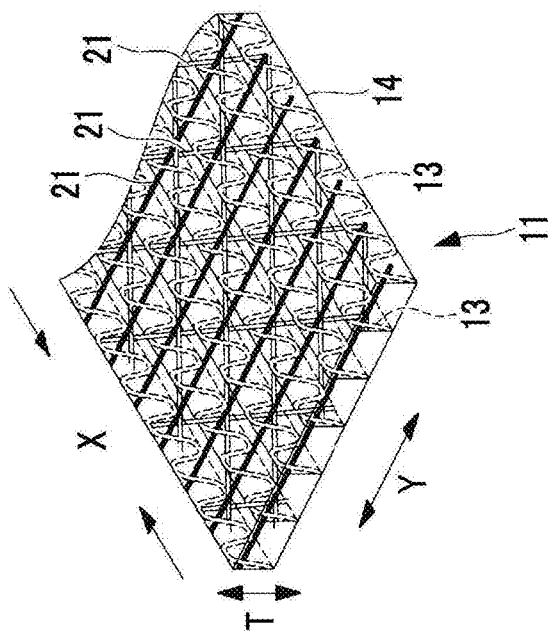
FIGS. 2A and 2B are partial perspective views illustrating one fabric layer into which a reinforcing material is woven.
Figure 2A:
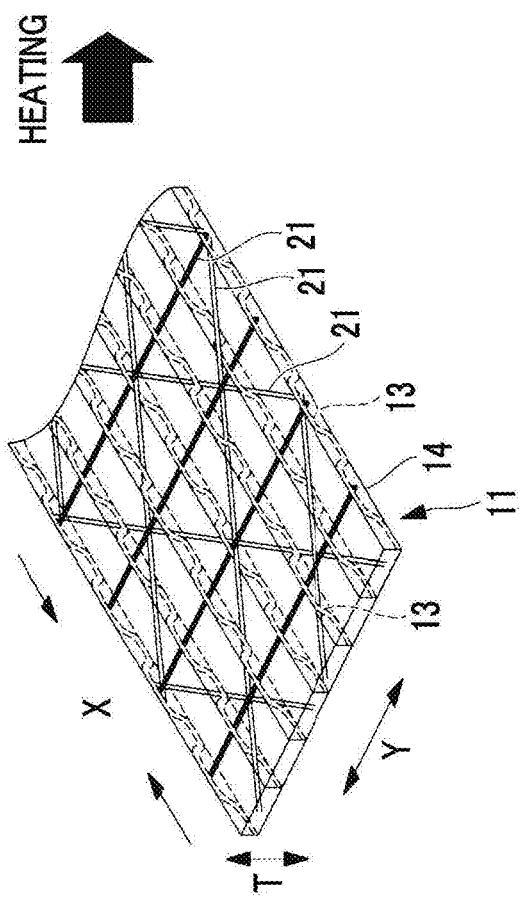

FIGS. 2A and 2B illustrates a single fabric layer into which the reinforcing material is woven. In the figure, FIG. 2A shows the fabric layer before heating, and FIG. 2B is the fabric layer which is caused to expand after the heating, where illustration of the wefts is omitted for simplicity. In FIGS. 2A and 2B, a reinforcing material 21 is woven in three directions including a weft direction Y and directions inclined with respect to the weft direction Y (inclined rightward and inclined leftward). For ease of identification, the reinforcing material 21 oriented in the weft direction Y is shown in black, and the reinforcing material 21 oriented in the inclined directions is shown in white. The reinforcing material 21 oriented in the weft direction Y and the reinforcing material 21 oriented in the inclined directions are woven between high shrinkage yarns present at upper and lower sides in the thickness direction T of each of the fabric layers 11. The fabric layer 11 illustrated in FIGS. 2A and 2B shrinks in the warp direction (X) by heating, and expands in the thickness direction T. The fabric layer after the expansion has a shape in which the yarn having low thermal shrinkage is bent due to a shrinkage stress of the yarn having high thermal shrinkage and expands in the thickness direction.

The material of the reinforcing material is carbon fiber, aramid fiber, glass fiber, or the like. The reinforcing material content in the multilayer structure fabrics 10a and 10b can be adjusted within a range that satisfies the required strength and rigidity. This makes it possible to adapt to shape changes such as the sheet thickness of the base material. For example, in a case of the carbon fiber, the reinforcing material content may be 80% or less by volume.

The material of the resin may be any material as long as it satisfies all of strength, rigidity, toughness, durability, environmental resistance, and the like required for the application site. For example, the material of the resin is an epoxy resin, polyether ether ketone (PEEK) or the like. The resin is not cured at a temperature at which the high shrinkage yarn 13 is caused to thermally shrink. Here, "being not cured" allows a curing reaction to an extent that expansion of the base material (the fabric layer 11) is not impeded. The resin may contain a suitable filler (such as chopped materials or powdered materials) to satisfy the required properties.

The fastening member is a rivet, a bolt, or the like. The fastening member fastens a first member and a second member in a state of penetrating through the first member, a joined member, and the second member so as to deliver a load between the members.

Next, a joined member assembly method according to this embodiment will be described. FIGS. 3A to 3C show a flowchart of the joined member assembly method according to the embodiment.

(Insertion of Base Material)

A base material 20a is inserted into a gap 17 between a first component 15 and a second component 16 which are overlapped (see FIG. 3A). Regarding the insertion site, a gap amount that is assumed to be generated from shape tolerance during manufacturing is estimated. The size and the like of the multilayer structure fabric are selected according to the estimated gap amount for insertion. The assumed gap amount also includes a gap amount assumed in advance in a design stage. The base material 20a is one before expansion and is easily inserted into the gap 17.

(Filling of Resin)

Next, the gap 17 is filled with a resin such that the base material is impregnated with a resin 18 (see FIG. 3B). At the time of filling of the resin 18, a spacer for securing necessary clearance for workability may be provided, the base material may be inserted and the resin may be injected thereinto. Accordingly, the base material 20a in the gap 17 is impregnated with the resin and the gap 17 is filled. In FIG. 3B, a form during the impregnation of the resin 18 is shown.

(Expansion of Base Material)

The base material is heated to a predetermined temperature so as to expand in the thickness direction. The heating may be carried out simultaneously with the filling of the resin 18 or at several timings before and after the filling. For example, when the temperature of the resin to be filled is equal to or higher than the predetermined temperature, the base material can be caused to expand simultaneously with the filling of the resin without being separately heated. For example, in a case where the temperature of the resin to be filled is lower than the predetermined temperature, the base material may be heated after the filling of the resin is completed.

The predetermined temperature is a temperature at which the high shrinkage yarn 13 can thermally shrink. The predetermined temperature may be appropriately set depending on the material of the high shrinkage yarn 13 and the like. For example, in a case where the high shrinkage yarn 13 is made of polyester, the high shrinkage yarn 13 shrink by being heated at 60° C. to 70° C. The warps and wefts having lower thermal shrinkage than the high shrinkage yarn 13 have low shrinkage at the corresponding temperature and thus caused to expand in the thickness direction of the fabric layer 11. The heating can be carried out using a heater mat, a hand dryer, an oven, or the like.

(Curing of Resin)

After the base material 20a is caused to expand, the resin 18 is cured to form a resin 18' (see FIG. 3C). In a case where a thermosetting resin such as an epoxy resin is used as the resin 18, the first component 15 and the second component 16 may be covered and heated by a heater mat or the like so that the resin 18 reaches its curing temperature (for example, 90° C. to 120° C.). In a case where the thermoplastic resin such as PEEK is used as the resin 18, cooling is carried out so that the resin 18 reaches its curing temperature. The cooling may be air cooling or may be positively carried out using cooling means such as a spot cooler.

(Fastening)

After the resin 18 is cured, the first component 15 and the second component 16 are fastened with the fastening member. For example, a rivet, a bolt, or the like is used.

According to the assembly method of this embodiment, by inserting the multilayer structure fabric into which the reinforcing material is woven into the gap, the base material improves the strength and rigidity required for the joined portion, and by holding the shape, excessive tensile load applied to the fastening member and excessive deformation locally generated in the members to be fastened can be prevented.

According to the assembly method of this embodiment, by heating the base material after being inserted into the gap, the base material expands and follows the shape of the gap. Therefore, the base material can be applied to a gap having a complex three-dimensional shape. By causing the shape of the base material to follow the shape of the gap, each of the components is firmly supported between the first component and the second component, and the shape of the joined member can be held. The joining surface can be corrected by curing in the gap. Accordingly, the strength and rigidity required for the joined portion can be improved, and excessive tensile load applied to the fastening member and excessive deformation locally generated in the members to be fastened can be prevented.

According to the assembly method of this embodiment, steps of measuring the shape of a gap and forming a seam according to the shape through machining are not necessary, and the efficiency of an assembly step can be increased.

Second Embodiment

The configuration of a joined member assembled by an assembly method according to this embodiment is the same as that of the first embodiment. The assembly method according to this embodiment is different from the first embodiment in the timing at which the base material is caused to expand. FIGS. 4A to 4D show a flowchart of a joined member assembly method according to this embodiment.

(Expansion of Base Material)

Figure 4A:
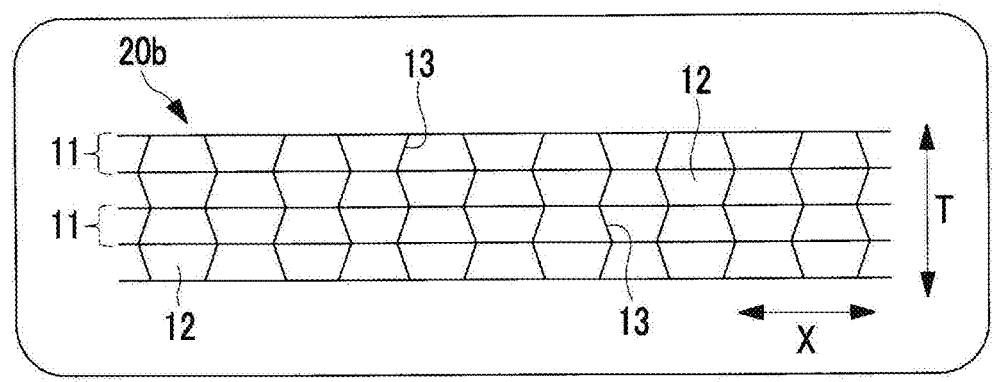
FIGS. 4A to 4D are flowcharts of a joined member assembly method according to a second embodiment.

A base material is heated to a predetermined temperature to expand in a thickness direction (see FIG. 4A). FIG. 4A shows a longitudinal section of a base material 20b after the expansion. The heating can be carried out using a heater, a hand dryer, an oven, or the like.

(Insertion of Base Material)

Figure 4B:
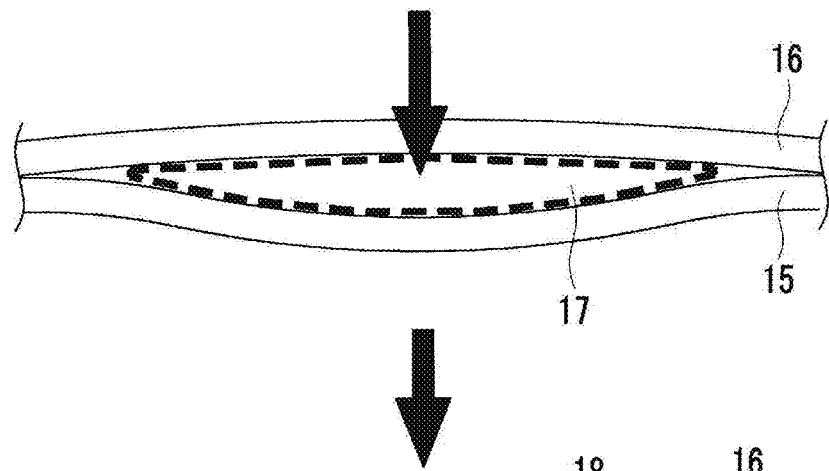

The expanded base material 20b is inserted into the gap 17 between the first component 15 and the second component 16 which are overlapped (mating surface side) (see FIG. 4A and FIG. 4B).

(Filling of Resin)

Figure 4C:
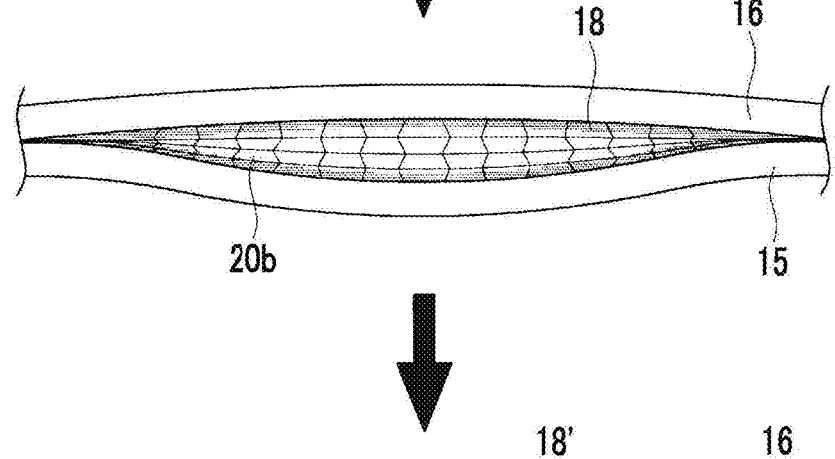

The gap 17 is filled with the resin 18 (see FIG. 4C). Accordingly, the base material 20b in the gap 17 is impregnated with the resin 18 and the gap 17 is filled. In FIG. 4C, a form during the impregnation of the resin 18 is shown.

(Curing of Resin)

Figure 4D:
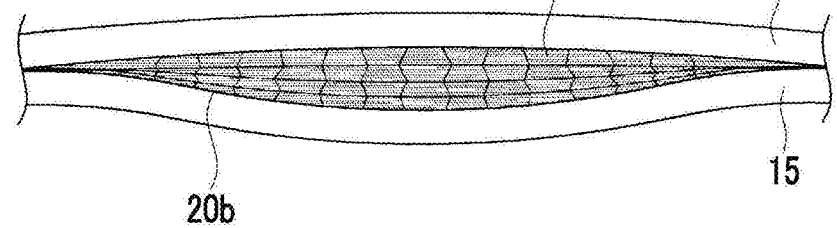
Figure 5A:
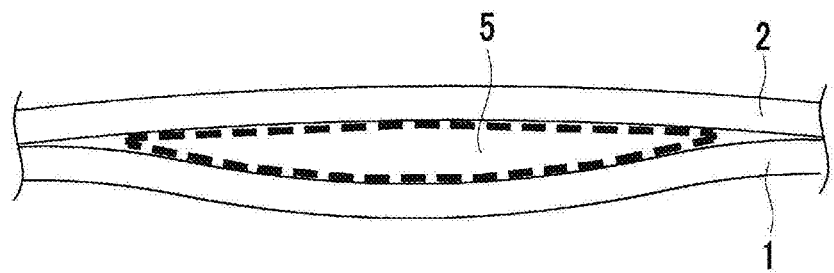
FIGS. 5A to 5C are views showing steps of a method in the related art in which a gap is filled with a seam made by machining.
Figure 5B:
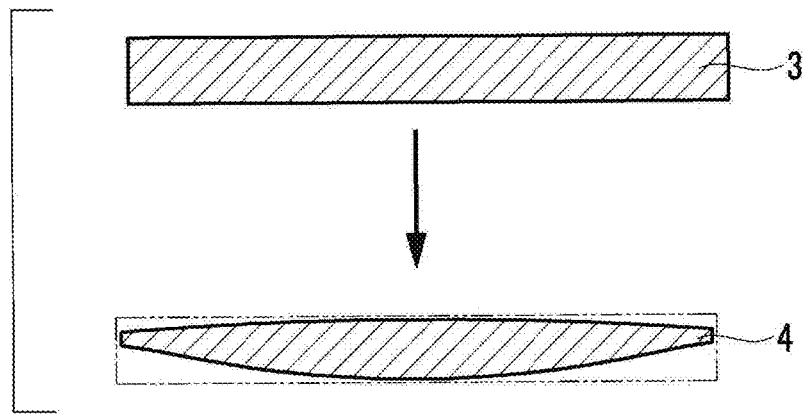
Figure 5C:
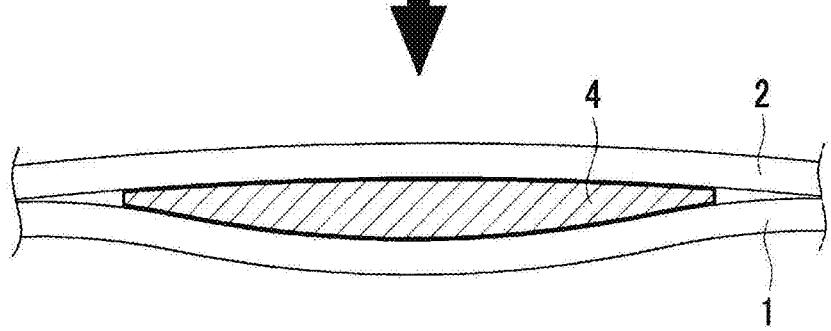

After completion of the impregnation of the resin 18, the resin 18 is cured in the same manner as in the first embodiment (see FIG. 4D).

(Fastening)

As in the first embodiment, the first component 15 and the second component 16 are fastened with the fastening member.

In this embodiment, since the base material has flexibility even after expansion, filling of the gap with the base material is possible, and the shape of the base material can also follow the shape of the gap. In addition to being able to cope with cases where heating and expansion are difficult after insertion into the gap, a base material having an appropriate size for the amount of a generated gap can be selected.

In the first embodiment and the second embodiment described above, the gap is present between the two members, but the gap is not limited thereto. For example, the gap may be a space interposed between three or more members.

The direction in which the high shrinkage yarn is woven may be in the weft direction (the direction perpendicular to the figure) of the fabric layer 11. In this case, the high shrinkage yarn 13 may have relatively high thermal shrinkage compared to at least the weft.

The invention claimed is:

1. A joined member assembly method comprising:
   inserting a base material comprising a multilayer structure fabric that is expandable by heating and is flexible after expansion and a reinforcing material woven into the multilayer structure fabric, into a gap between a plurality of overlapped members;
   heating the base material so as to cause the base material to expand in a thickness direction;
   filling the gap with a resin so as to cause the base material to be impregnated with the resin; and
   curing the resin, and
   wherein the multilayer structure fabric has a fabric layer in which at least two kinds of yarns which are different in thermal shrinkage so as to expand in the thickness direction by being heated are arranged,
   wherein, in the heating of the base material so as to cause the base material to expand in the thickness direction, a yarn having relatively high thermal shrinkage shrinks by the heating so as to cause the fabric layer to expand in the thickness direction, and
   the heating of the base material precedes the filling of the gap with the resin.

2. The joined member assembly method according to claim 1,
   wherein the base material is heated so as to expand in the thickness direction, the expanded base material is inserted into the gap, the base material is thereafter impregnated with the resin, and the resin is thereafter cured.

* * * * *